US011973676B2

(12) United States Patent
Ganapathy et al.

(10) Patent No.: US 11,973,676 B2
(45) Date of Patent: Apr. 30, 2024

(54) USING ANALYTICS TO ASSIST WITH USER ACTIVITY SCHEDULING

(71) Applicant: ARRIS Enterprises LLC, Suwanee, GA (US)

(72) Inventors: Jalagandeswari Ganapathy, Bangalore (IN); Anil Radhakrishnan, Bangalore (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/402,852

(22) Filed: Aug. 16, 2021

(65) Prior Publication Data

US 2022/0094618 A1 Mar. 24, 2022

Related U.S. Application Data

(60) Provisional application No. 63/080,372, filed on Sep. 18, 2020.

(51) Int. Cl.
*H04L 43/0876* (2022.01)
*H04L 43/045* (2022.01)

(52) U.S. Cl.
CPC ........ *H04L 43/0876* (2013.01); *H04L 43/045* (2013.01)

(58) Field of Classification Search
None
See application file for complete search history.

(56) References Cited

U.S. PATENT DOCUMENTS

| 2016/0182329 | A1* | 6/2016 | Armolavicius | H04L 41/082 370/230 |
| 2019/0052532 | A1* | 2/2019 | Chen | H04L 47/781 |
| 2021/0152417 | A1* | 5/2021 | Baird | H04L 41/0823 |
| 2022/0245226 | A1* | 8/2022 | Sawada | G06Q 10/063 |

* cited by examiner

*Primary Examiner* — Anh Nguyen
(74) *Attorney, Agent, or Firm* — Wenderoth, Lind & Ponack, L.L.P.

(57) ABSTRACT

A system and method are provided for a client device for use with a home network controller and a local area network. The home network controller hast network usage information stored therein. The client device also contains a memory and a processor configured to execute instructions stored on the memory to cause the client device to: provide a calendar database; retrieve the network usage information from the home network controller; receive an entry to the calendar database; and provide an indication to the user associated with the entry to the calendar database based on the network usage information.

6 Claims, 4 Drawing Sheets

USING ANALYTICS TO ASSIST WITH USER ACTIVITY SCHEDULING

BACKGROUND

Embodiments of the present disclosure relate to indicating network usage information when scheduling entries on a calendar database.

SUMMARY

Aspects of the present disclosure are drawn to a client device for use with a home network controller and a local area network (LAN). The home network controller has network usage information stored therein. The client device includes a memory and a processor configured to execute instructions stored on the memory to cause the client device to: provide a calendar database; retrieve the network usage information from the home network controller; receive an entry to the calendar database; and provide an indication to the user associated with the entry to the calendar database based on the network usage information.

In some embodiments, the client device is configured so that the network usage information includes a moving average of network bandwidth usage over predetermined period of time.

In some embodiments, the client device is configured so that the indication includes a suggestion to change the entry to the calendar database.

Other aspects of the present disclosure are drawn to a method of using a client device with a home network controller and a LAN, the home network controller having network usage information stored therein. The method includes: providing, via a processor configured to execute instructions stored on a memory, a calendar database; retrieving, via the processor, the network usage information from the home network controller; receiving, via the processor, an entry to the calendar database; and providing, via the processor, an indication to the user associated with the entry to the calendar database based on the network usage information.

In some embodiments, the network usage information of the method includes a moving average of network bandwidth usage over predetermined period of time.

In some embodiments, the indication of the method includes a suggestion to change the entry to the calendar database.

Other aspects of the present disclosure are drawn to a non-transitory, computer-readable media having computer-readable instructions stored thereon, the computer-readable instructions being capable of being read by a client device for use with a home network controller and a LAN, the home network controller having network usage information stored therein. The computer-readable instructions are capable of instructing the client device to perform the method comprising: providing, via a processor configured to execute instructions stored on a memory, a calendar database; retrieving, via the processor, the network usage information from the home network controller; receiving, via the processor, an entry to the calendar database; and providing, via the processor, an indication to the user associated with the entry to the calendar database based on the network usage information.

In some embodiments, the computer-readable instructions are capable of instructing the client device to perform the method wherein the network usage information includes a moving average of network bandwidth usage over predetermined period of time.

In some embodiments, the computer-readable instructions are capable of instructing the client device to perform the method wherein the indication includes a suggestion to change the entry to the calendar database.

BRIEF SUMMARY OF THE DRAWINGS

The accompanying drawings, which are incorporated in and form a part of the specification, illustrate example embodiments and, together with the description, serve to explain the principles of the present disclosure. In the drawings.

DETAILED DESCRIPTION

Today's homes often have communications networks that contain many client devices, such as smart phones and personal computers, that connect to the Internet through various network controllers, such as routers, modems, and wireless access points. With the increasing popularity of online conferences, classes, and seminars, it is not uncommon for users to experience problems related to limited network capacity. This is often manifested in video streams that freeze or black out, or in audio streams that become garbled. Some of these problems can be avoided or mitigated if users are aware of network usage trends and can schedule their activities to avoid periods of heavy network use.

What is needed is a system and method for providing a user an indication of possible network constraints when scheduling activities.

A system and method in accordance with the present disclosure provides an indication of possible network constraints when a user schedules an online activity.

In accordance with the present disclosure, a user creates or changes an entry on a calendar database using a client device. The client device retrieves network usage information from a home network controller. The client device determines whether the calendar entry may experience network constraints, based on the retrieved network usage information. The client device indicates to the user, via a user interface, that the calendar entry may experience a network constraint. In some embodiments, the user interface suggests a change to the calendar entry.

An example system and method for indicating a network constraint on a calendar entry in accordance with aspects of the present disclosure will now be described in greater detail with reference to FIGS. 1-4C.

Figure 1:
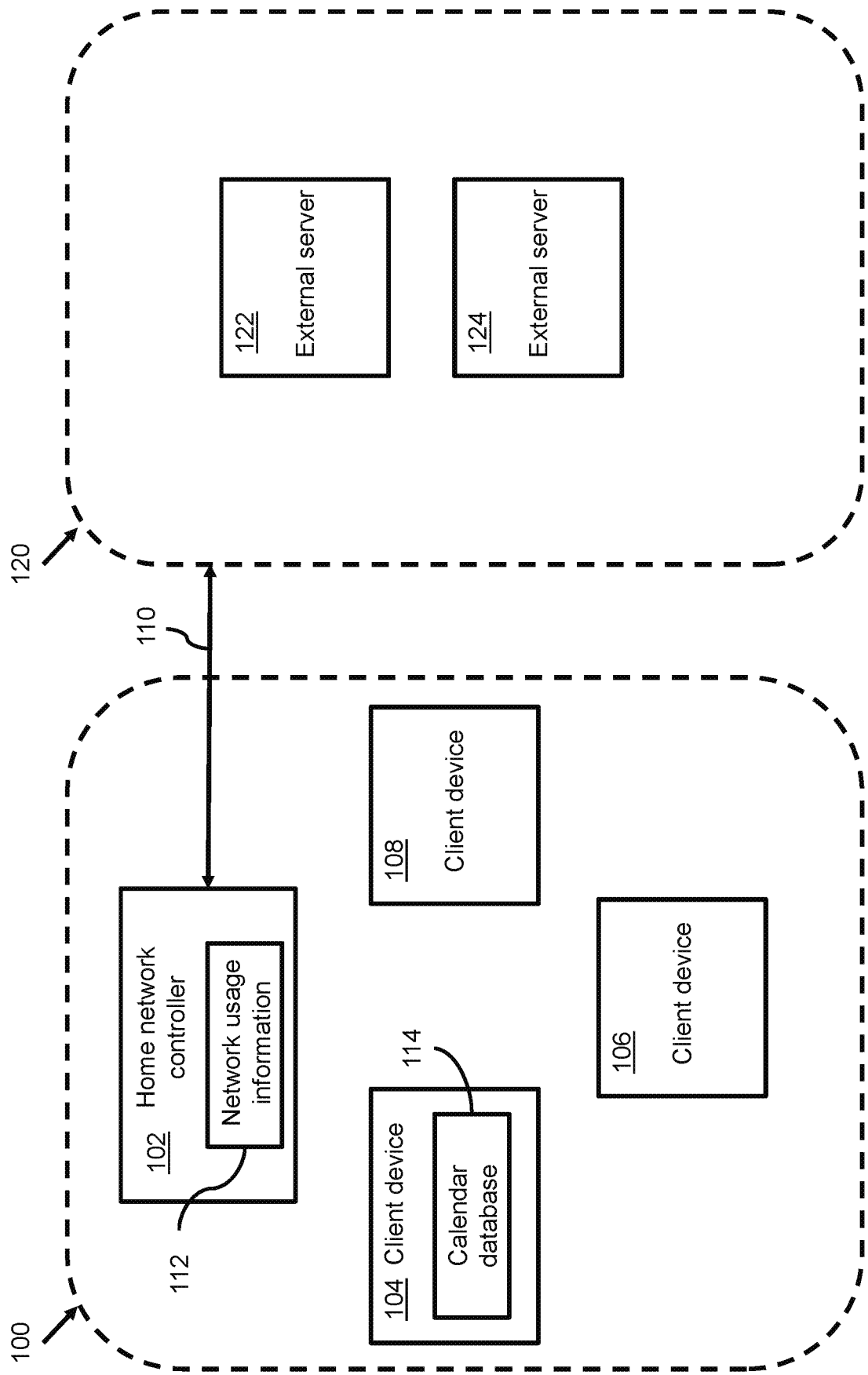
FIG. 1 illustrates a network containing a home network controller and client devices, in accordance with aspects of the present disclosure.

FIG. 1 illustrates LAN 100 containing home network controller 102 and client devices 104, 106, and 108, in accordance with aspects of the present disclosure.

As shown in the figure, LAN 100 includes home network controller 102, and client device 104, 106, and 108. Internet 120 contains external servers 122 and 124. LAN 100 is arranged to communicate to Internet 120 by way of communications channel 110. Home network controller 102 contains network usage information 112. Client device 104 contains calendar database 114.

Home network controller 102 is any device or method that establishes LAN 100, such that client devices 104, 106, and 108 are able to communicate with home network controller 102. In this non-limiting example, LAN 100 uses Wi-Fi to establish a wireless network. The term Wi-Fi as used herein may be considered to refer to any of Wi-Fi 4, 5, 6, 6E, or any variation thereof. In another example embodiment, home network controller 102 communicates with client devices 104, 106, and 108 over wired Ethernet connections.

Client devices 104, 106, and 108 are any devices or methods that present content and accept inputs from users. In this non-limiting example, client devices 104, 106, and 108 may be smart phones, tablets, personal computers, TV set-top boxes, or videogame consoles.

Internet 120 is a global set of interconnected computing resources and networks. External servers 122 and 124 are any devices or methods that provide computing storage and processing and are disposed externally to LAN 100.

Communications channel 110 is any device or method that facilitate communications between devices or networks. Communications channel 110 can be implemented using any combination of wide area networks (WANs), virtual private networks (VPNs), metropolitan area networks (MANs), system area networks (SANs), local-area networks (LANs), DOCSIS networks, fiber optics networks, digital subscriber lines (DSLs), public switched data networks (PSDNs), global Telex network, 2G/3G/4G/5G networks, or Wi-Fi networks, for example.

Network usage information 112 contains data and statistics about network traffic of client devices 104, 106, and 108. In this non-limiting example, network usage information 112 contains a moving average of network bandwidth usage over a predetermined period of time. In other example embodiments, network usage information 112 may contain network traffic data or statistics that are collected or calculated by other methods such as agent-based models.

For purposes of discussion, network usage information 112 is shown as being contained in home network controller 102. In other example embodiments, network usage information 112 may be contained in external server 122.

Calendar database 114 contains data regarding a user's scheduled activities. In this non-limiting example, calendar database 114 is shown as being contained in client device 104. In other example embodiments, calendar database 114 may be contained in external server 124.

In operation, home network controller 102 collects network usage information 112 about client devices 104, 106, and 108 over a period of time. When a user tries to create or modify a calendar entry on calendar database 114, client device 104 retrieves network usage information 112 from home network controller 102. Client device 104 determines whether the proposed calendar entry might experience network usage constraints, and if so, provides an indication to the user. In some embodiments, client device 104 suggests alternate calendar entries from calendar database 114.

FIG. 1 illustrates LAN 100 containing home network controller 102 and client devices 104, 106, and 108. Aspects of scheduling a calendar entry that is subject to a network usage constraint will now be discussed with reference to FIG. 2.

Figure 2:
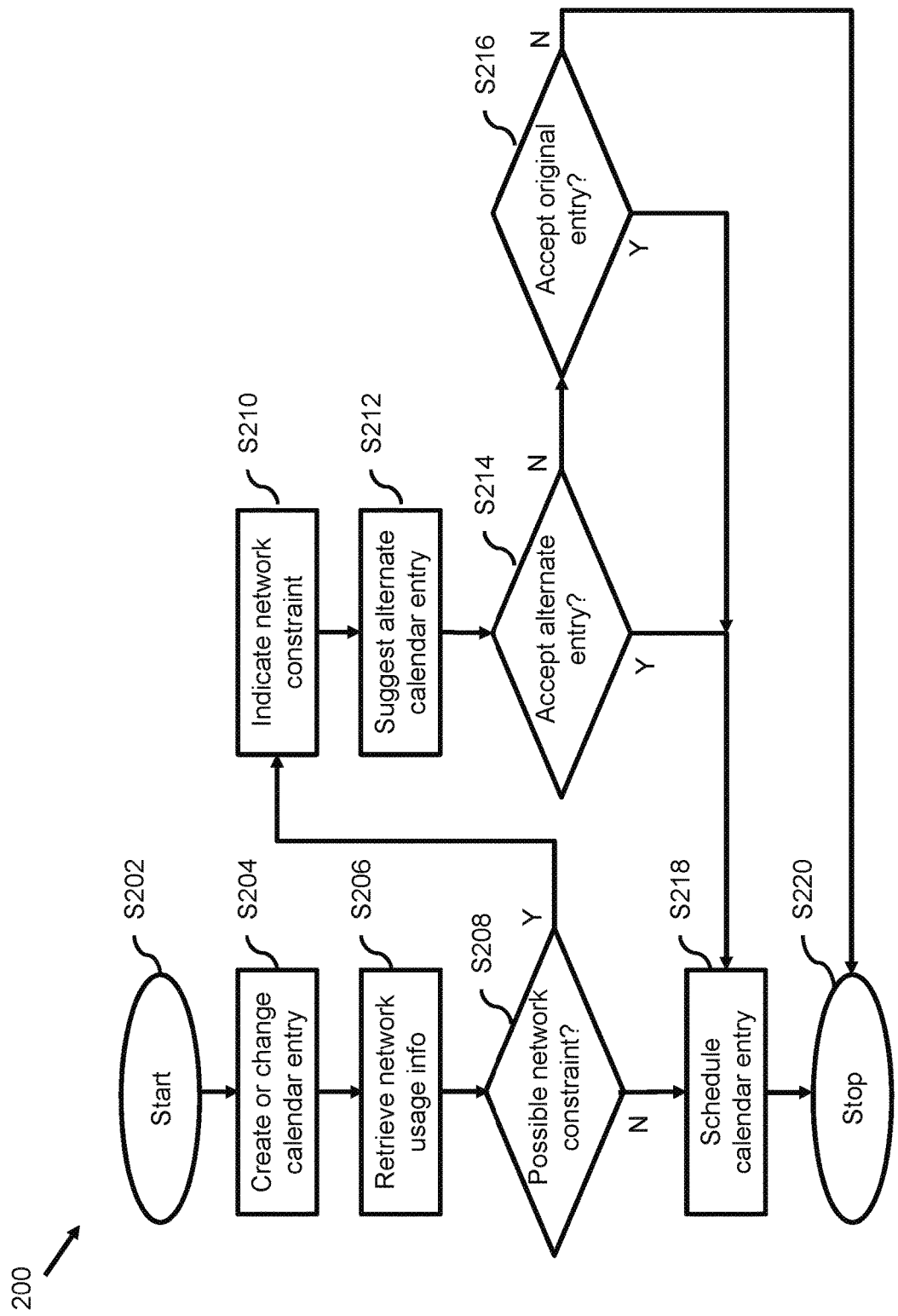
FIG. 2 illustrates an algorithm to be executed by a processor for scheduling a calendar entry that is subject to a network usage constraint, in accordance with aspects of the present disclosure.

FIG. 2 illustrates an algorithm 200 to be executed by a processor for scheduling a calendar entry that is subject to a network usage constraint, in accordance with aspects of the present disclosure. Algorithm 200 will be further discussed with reference to FIGS. 3-4C.

Figure 3:
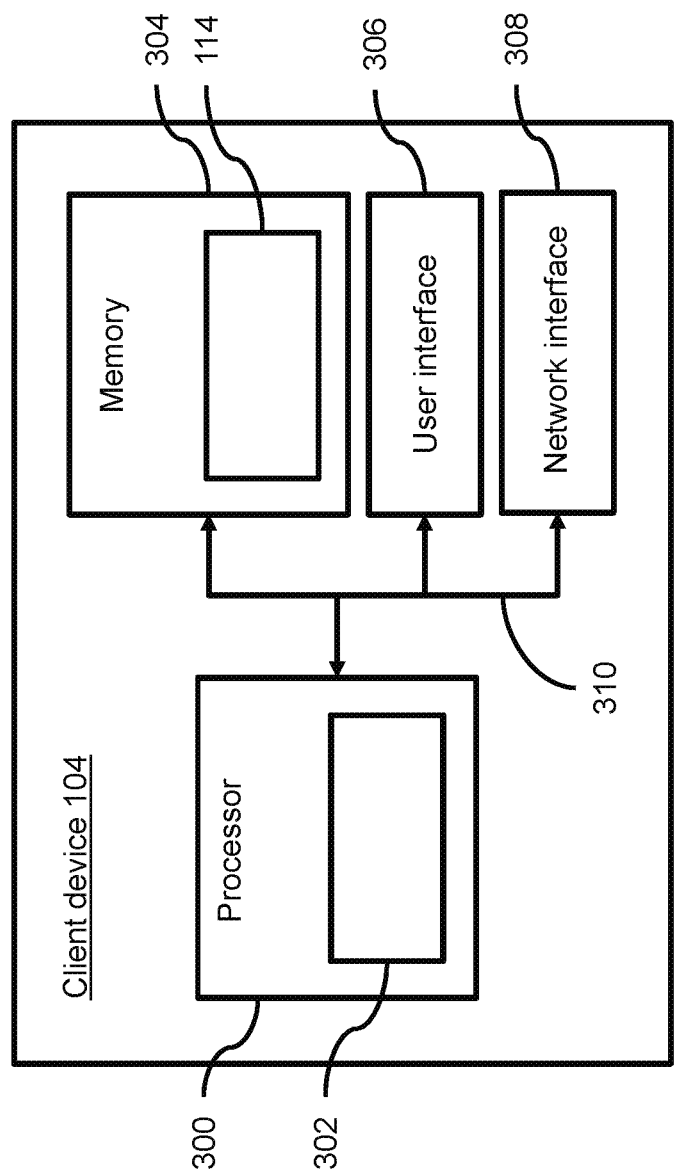
FIG. 3 illustrates details of a client device, in accordance with aspects of the present disclosure.

FIG. 3 illustrates details of client device 104, in accordance with aspects of the present disclosure.

As shown in the figure, client device 104 includes processor 300, memory 304, user interface 306, network interface 308, and bus 310. Program 302 runs on processor 300. Calendar database 114 is contained in memory 304.

Processor 300 is any device or system capable of controlling general operations of client device 104 and includes, but is not limited to, a central processing unit (CPU), a hardware microprocessor, a single core processor, a multi-core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 104.

As will be described in greater detail below, program 302 includes instructions, that when executed by processor 300, enable client device 104 to: provide calendar database 114 in memory 304; retrieve network usage information 112 from home network controller 102; receive an entry to calendar database 114; and provide an indication to the user associated with the entry to calendar database 114 based on network usage information 112.

As will be described in greater detail below, network usage information 112 includes a moving average of network bandwidth usage over predetermined period of time.

As will be described in greater detail below, the indication includes a suggestion to change the entry to calendar database 114.

Memory 304 is any device or system capable of storing data and instructions used by client device 104 and includes, but is not limited to, random-access memory (RAM), dynamic random-access memory (DRAM), a hard drive, a solid-state drive, read-only memory (ROM), erasable programmable read-only memory (EPROM), electrically erasable programmable read-only memory (EEPROM), flash memory, embedded memory blocks in an FPGA, or any other various layers of memory hierarchy.

Network interface 308 is any device or system capable of establishing and maintaining LAN 100 and includes, but is not limited to, a Wi-Fi radio, an Ethernet interface, a Bluetooth radio, a Zigbee radio, a cable modem, or a 2G/3G/4G/5G radio.

In this example, processor 300, memory 304, and network interface 308 are illustrated as individual devices of client device 104. However, in some embodiments, at least two of processor 300, memory 304, and network interface 308 may be combined as a unitary device. Further, in some embodiments, at least one of processor 300, memory 304, and network interface 308 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an ASIC, or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Bus 310 is any device or system that provides data communications between processor 300, memory 304, user interface 306, and network interface 308. Bus 310 can be one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Program 302 controls the operations of client device 104. Program 302, having a set (at least one) of program modules, may be stored in memory 304 by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

User interface 306 is any device or system capable of presenting information and accepting user inputs on client device 104 and includes, but is not limited to, a liquid crystal display (LCD), a thin film transistor (TFT) display, a light-emitting diode (LED) display, or other similar display device, including a display device having touch screen capabilities so as to allow interaction between the user and client device 104. In other embodiments, user interface 306 may include a button, a speaker, or a microphone.

User interface 306 will now be further discussed with reference to FIGS. 4A-C.

Figure 4C:
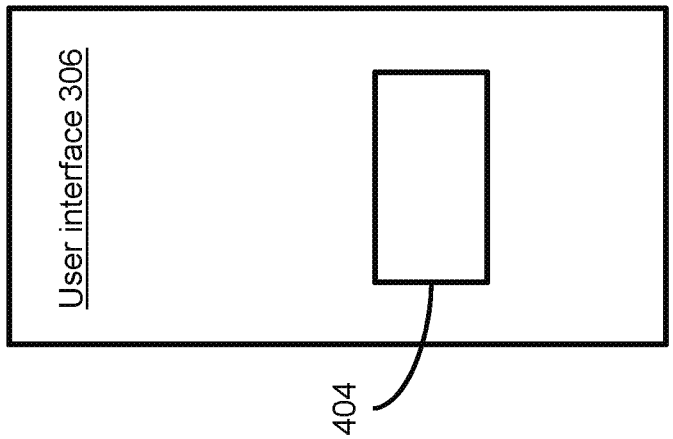
FIGS. 4A-C illustrate an example user interface, in accordance with aspects of the present disclosure.
Figure 4B:
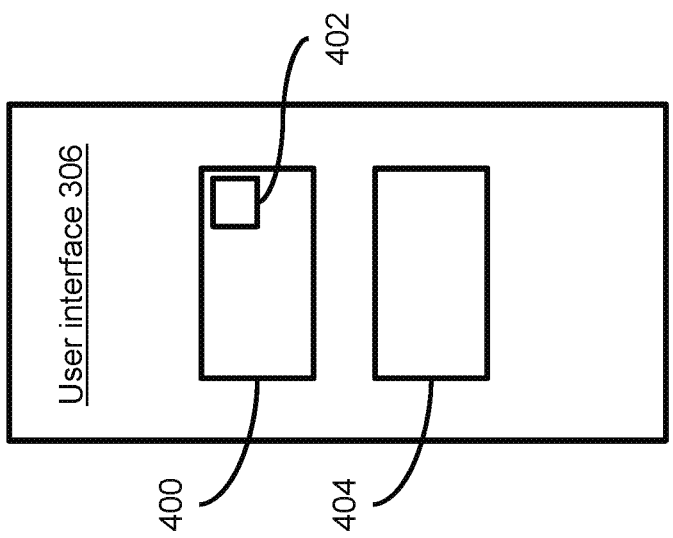
Figure 4A:
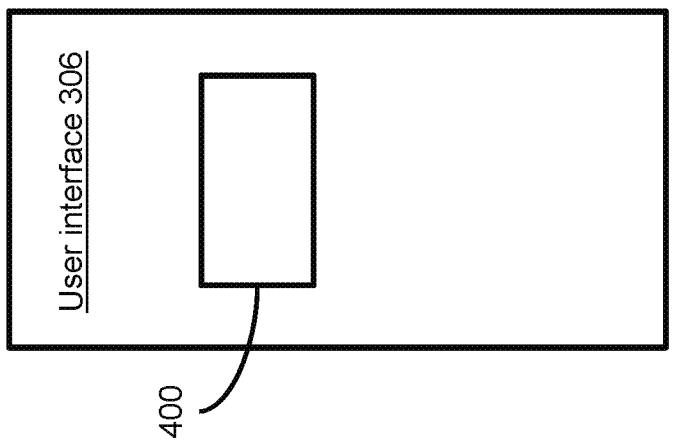

FIGS. 4A-C illustrate example user interface 306, in accordance with aspects of the present disclosure.

As shown in the figures, user interface 306 contains calendar entries 400 and 404, and indicator 402.

Calendar entries 400 and 404 represent time slots for events or activities to be scheduled by the user. In this non-limiting example, calendar entries 400 and 404 may be videoconferences, webinars, podcasts, or online education materials.

Indicator 402 shows that calendar entry 400 may experience a network constraint. In this non-limiting example, indicator 402 may be a colored flag, a highlighted graphic, or an audio alert.

In operation, calendar entry 400 is created or edited by the user, as illustrated in FIG. 4A. Program 302 determines that calendar entry 400 is scheduled at a time and date that has a history of network congestion. Program 302 activates indicator 402 and suggests alternate calendar entry 404, as illustrated in FIG. 4B. The user changes the activity time to calendar entry 404, as illustrated in FIG. 4C. This sequence will be further discussed with reference to FIG. 2.

Referring to FIG. 2, algorithm 200 starts (S202) and waits for the user to create or change a calendar entry (S204). In an example embodiment, calendar entry 400 is created or modified by the user, as illustrated in FIG. 4A. Program 302 on processor 300 accesses calendar entry 400 on calendar database 114, as illustrated in FIG. 3.

Returning to FIG. 2, after the user to creates or changes a calendar entry (S204), network usage information is retrieved (S206). In an example embodiment, processor 300 executes instructions within program 302 to cause client device 104 to retrieve network usage information 112 from home network controller 102, as illustrated in FIG. 1.

Returning to FIG. 2, after network usage information is retrieved (S206), it is determined whether a calendar entry is subject to any network constraints (S208). In an example embodiment, processor 300 executes instructions within program 302 to cause client device 104 to examine network usage information 112 and determine whether calendar entry 400 might experience network constraints, based on historical network usage trends and the types of activities described by calendar entry 400.

For purposes of discussion and referring to FIG. 1, suppose that network usage information 112 shows that client devices 106 and 108 are used in online education every Tuesday and Thursday at 9-11 am and that these activities require high amounts of network bandwidth. Suppose that calendar entry 400 is a videoconference scheduled for Tuesday at 10 am. Program 302 then examines whether the network bandwidth required for calendar entry 400 may be constrained, given historical trends indicated in network usage information 112.

Returning to FIG. 2, if there is no network constraint (N on S208), then the calendar entry is allowed (S218) to be scheduled and algorithm 200 stops (S220). In an example embodiment, referring to FIG. 3, processor 300 executes instructions within program 302 to cause processor 300 to create calendar entry 400 on calendar database 114.

Returning to FIG. 2, if possible network constraint is detected (Y on S208), then the user is alerted about the network constraint (S210). In an example embodiment, processor 300 executes instructions within program 302 to cause indicator 402 to appear on user interface 306, as illustrated in FIG. 4B.

Returning to FIG. 2, after the user is alerted about the network constraint, an alternate calendar entry that is not subject to network constraints is suggested (S212). In operation, processor 300 executes instructions within program 302 to cause user interface 306 to display calendar entry 404, as illustrated in FIG. 4B. In this example, program 302 suggests calendar entry 404 with a time slot of Tuesday at 2 pm. For purposes of discussion, only one alternate calendar entry is illustrated in FIG. 4B. However, it is contemplated that more than one alternate calendar entry can be suggested by program 302; for example, program 302 may suggest alternate times of Tuesday at 2 pm and Wednesday at 10 am, neither of which have network constraints as indicated by network usage information 112.

Returning to FIG. 2, after the alternate calendar entry is suggested (S212), it is determined whether the alternate calendar entry is acceptable (S214). If so (Y on S214), then the alternate calendar entry is scheduled (S218) and algorithm 200 stops (S220). In an example embodiment, as shown in FIG. 3 the user selects calendar entry 404 by way of user interface 306. Processor 300 then executes instructions within program 302 to cause calendar entry 400 and indicator 402 disappear, as illustrated in FIG. 4C. Processor 300 then executes instructions within program 302 to cause processor 300 to add calendar entry 404 and removes calendar entry 400 from calendar database 114.

Returning to FIG. 2, if the user rejects calendar entry 404 (N on S214), then it is determined whether the user wants to the previous schedule calendar entry despite network constraints (S216). For example, if the user decides to keep calendar entry 400 (Y on S216), then processor 300 executes instructions within program 302 to cause processor 300 to schedules the calendar entry (S218) and algorithm 200 stops (S220). In this example, the user decides to keep the videoconference time of Tuesday at 10 am, despite the potential for degraded video or audio quality, perhaps because the meeting cannot be scheduled at any other time.

If the user decides to reject calendar entry 400 (N on S216), then algorithm 200 stops (S220) without scheduling the calendar entry.

Communications networks in today's homes and offices often host multiple client devices. When these client devices demand simultaneous access to network resources, network congestion and degradation of services can occur.

In accordance with the present disclosure, a home network controller monitors historical network usage. A client device can retrieve network usage information from the home network controller when a new activity is scheduled, and can check whether the activity might be subject to potential network constraints. Thus, the present disclosure provides a system and method of indicating potential network constraints when scheduling online activities and avoiding degradations in network services.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A client device for use with a home network controller and a local area network, the home network controller having network usage information stored therein, said client device comprising:
a memory; and
a processor configured to execute instructions stored on said memory to cause said client device to:
provide a calendar database that contains data regarding one or more scheduled activities of a user;
retrieve the network usage information from the home network controller;
receive an entry to the calendar database;
provide a suggestion to change the entry to the calendar database to the user associated with the entry to the calendar database based on the network usage information;
allow the change to the entry to the calendar when no one or more network constraints are determined; and
cause an alert associated with the change to the entry to the calendar when one or more network constraints are detected.

2. The client device of claim 1, wherein the network usage information includes a moving average of network bandwidth usage over predetermined period of time.

3. A method of using a client device with a home network controller and a local area network, the home network controller having network usage information stored therein, said method comprising:
providing, via a processor configured to execute instructions stored on a memory, a calendar database that contains data regarding one or more scheduled activities of a user;
retrieving, via the processor, the network usage information from the home network controller;
receiving, via the processor, an entry to the calendar database;
providing, via the processor, a suggestion to change the entry to the calendar database to the user associated with the entry to the calendar database based on the network usage information;
allow the change to the entry to the calendar when no one or more network constraints are determined; and
cause an alert associated with the change to the entry to the calendar when one or more network constraints are detected.

4. The method of claim 3, wherein the network usage information includes a moving average of network bandwidth usage over predetermined period of time.

5. A non-transitory, computer-readable media having computer-readable instructions stored thereon, the computer-readable instructions being capable of being read by a client device for use with a home network controller and a local area network, the home network controller having network usage information stored therein, wherein the computer-readable instructions are capable of instructing the client device to perform the method comprising:

provide, via a processor configured to execute instructions stored on a memory, a calendar database that contains data regarding one or more scheduled activities of a user;

retrieving, via the processor, the network usage information from the home network controller;

receiving, via the processor, an entry to the calendar database;

providing, via the processor, a suggestion to change the entry to the calendar database to the user associated with the entry to the calendar database based on the network usage information;

allowing the change to the entry to the calendar when no one or more network constraints are determined; and causing an alert associated with the change to the entry to the calendar when one or more network constraints are detected.

6. The non-transitory, computer-readable media of claim 5, wherein the computer-readable instructions are capable of instructing the client device to perform the method wherein the network usage information includes a moving average of network bandwidth usage over predetermined period of time.

* * * * *